US010106275B2

(12) United States Patent
Sasscer et al.

(10) Patent No.: US 10,106,275 B2
(45) Date of Patent: Oct. 23, 2018

(54) RAM AIR TURBINE STOWING SYSTEM

(71) Applicant: Hamilton Sundstrand Corporation, Charlotte, NC (US)

(72) Inventors: Gary Sasscer, Leaf River, IL (US); Magdy A. Kandil, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 534 days.

(21) Appl. No.: 14/677,194

(22) Filed: Apr. 2, 2015

(65) Prior Publication Data

US 2016/0288919 A1 Oct. 6, 2016

(51) Int. Cl.
*B64D 41/00* (2006.01)
*F15B 15/14* (2006.01)

(52) U.S. Cl.
CPC ............ *B64D 41/007* (2013.01); *F15B 15/14* (2013.01); *Y02T 50/44* (2013.01)

(58) Field of Classification Search
CPC ................................ F15B 11/10; F15B 11/15
USPC ................................................ 92/134, 130 R
See application file for complete search history.

(56) References Cited

U.S. PATENT DOCUMENTS 3,149,678 A 9/1964 Chilman et al.
8,302,902 B2 * 11/2012 Lynas .................... B64C 25/22 244/102 R
2002/0070368 A1 * 6/2002 Rountree ................ E21B 47/18 251/30.01
2004/0060430 A1 4/2004 Brinkman
2004/0129835 A1 * 7/2004 Atkey .................... B64D 13/06 244/118.5
2006/0070378 A1 * 4/2006 Geiger .................... B29C 45/67 60/475
2012/0180878 A1 * 7/2012 Greenwood ....... A01B 63/1006 137/488

FOREIGN PATENT DOCUMENTS

GB 1052706 A 12/1966
WO WO-8702642 A1 5/1987

OTHER PUBLICATIONS

Extended European Search Report dated Sep. 12, 2016, in corresponding European Patent Application No. EP16163717.

* cited by examiner

*Primary Examiner* — Thomas E Lazo
*Assistant Examiner* — Daniel Collins
(74) *Attorney, Agent, or Firm* — Locke Lord LLP; Daniel J. Fiorello; Scott D. Wofsy

(57) ABSTRACT

A ram air turbine (RAT) stowing system includes a closed loop hydraulic circuit configured to hold a quantity of a hydraulic fluid to be utilized only by the RAT stowing system and a RAT actuator disposed in fluid communication with the closed loop hydraulic circuit. A pump system is connected to the hydraulic circuit to selectively pump the hydraulic fluid to a stow reservoir portion of the RAT actuator to move the RAT actuator from a deployed position to a stowed position. A control valve is connected to the hydraulic circuit between the RAT actuator and the pump to selectively allow the hydraulic fluid to be drained from the stow reservoir portion of the RAT actuator in a drain state and to allow the hydraulic fluid to be pumped into the stow reservoir portion of the RAT actuator in a pump state.

13 Claims, 5 Drawing Sheets

RAM AIR TURBINE STOWING SYSTEM

BACKGROUND

1. Field

The present disclosure relates to retraction systems for hydraulic devices, more specifically for hydraulic stowing systems for ram air turbines.

2. Description of Related Art

Stowing a ram air turbine (RAT) following a deployment is traditionally a ground operation. Traditional RAT actuators are connected to aircraft hydraulic systems to stow the RAT using operating pressure from the aircraft hydraulic system. However, connecting the RAT actuator to the aircraft hydraulic system drives weight and cost up due to system and FAA regulations regarding equipment compliance associated with critical aircraft systems.

Such conventional methods and systems have generally been considered satisfactory for their intended purpose. However, there is still a need in the art for improved RAT stowing systems. The present disclosure provides a solution for this need.

SUMMARY

A ram air turbine (RAT) stowing system includes a closed loop hydraulic circuit configured to hold a quantity of a hydraulic fluid to be utilized only by the RAT stowing system and a RAT actuator disposed in fluid communication with the closed loop hydraulic circuit. A pump system is connected to the hydraulic circuit to selectively pump the hydraulic fluid to a stow reservoir portion of the RAT actuator to move the RAT actuator from a deployed position to a stowed position. A control valve is connected to the hydraulic circuit between the RAT actuator and the pump to selectively allow the hydraulic fluid to be drained from the stow reservoir portion of the RAT actuator in a drain state and to allow the hydraulic fluid to be pumped into the stow reservoir portion of the RAT actuator in a pump state.

The hydraulic fluid can be drained from the stow reservoir portion of the RAT actuator through the closed loop hydraulic circuit to a deploy reservoir portion of the RAT actuator. The closed loop hydraulic circuit can include an accumulator disposed therein for accumulating a predetermined quantity of the hydraulic fluid when the valve is in the drain state. The closed loop hydraulic circuit can include a pressure relief valve for preventing over pressurization by the pump system.

The control valve can include a pressure actuated valve, wherein the control valve is biased to the drain state, such that a predetermined pressure from the pump system causes the control valve to change from the drain state to the pump state. A rate control orifice can be disposed between the control valve and the pump system for controlling a rate of pressure build up and/or relief on the control valve to control the rate of state change.

The pump system can include a pump and a motor. The motor is operatively connected to an electrical source. The electrical source can be an aircraft battery, ground power, or any other suitable electrical source.

The RAT actuator can be operatively associated with a locking mechanism to lock the RAT in the stowed position such that the pump system can turn off after locking the RAT actuator in the stowed position so as to relieve hydraulic pressure from the RAT actuator in order to allow the RAT to be freely redeployed. The RAT actuator can be biased to move to the deployed position when the locking mechanism is released. In certain embodiments, the RAT actuator can be biased with a spring.

A method includes stowing a ram air turbine (RAT) using a RAT stowing system, the RAT stowing system as described above.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
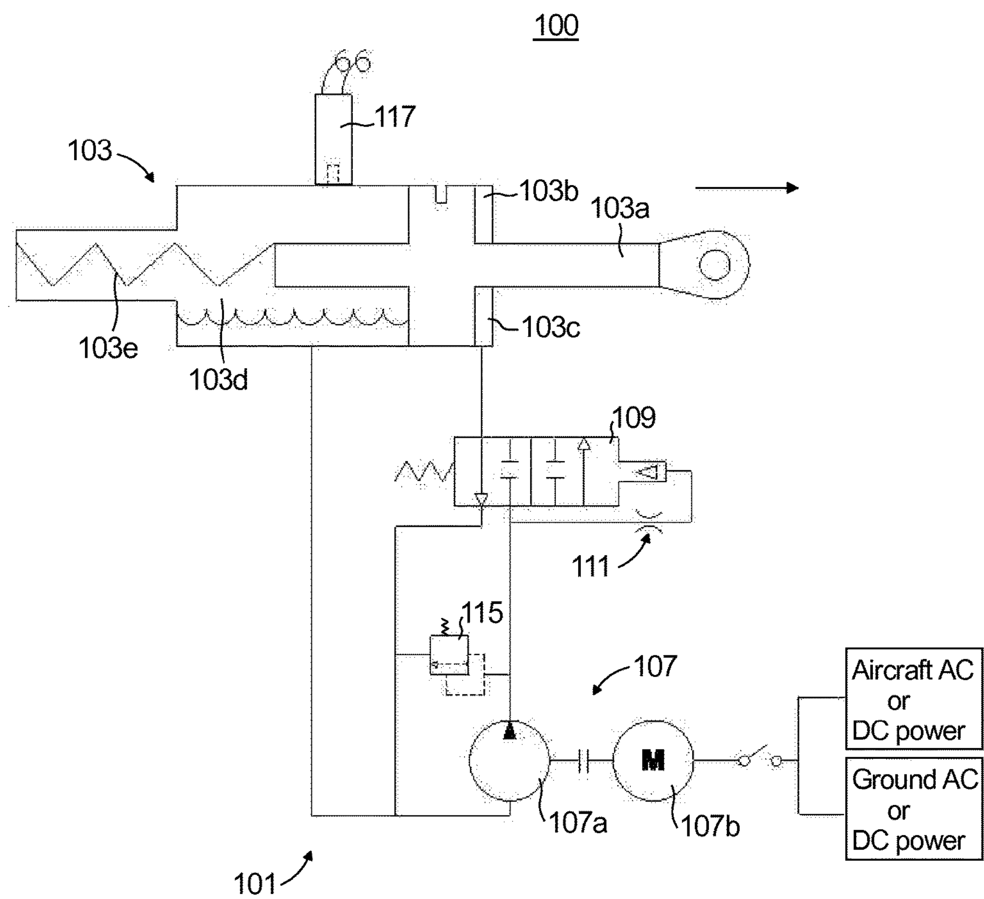
FIG. 1A is a schematic view of an embodiment of a system in accordance with this disclosure, showing the actuator moving toward the deployed position and the control valve in a drain position.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1A and is designated generally by reference character 100. Other embodiments and/or aspects of this disclosure are shown in FIGS. 1B-2B. The systems and methods described herein can be used to simplify and increase reliability of ram air turbine stowing systems.

Figure 1B:
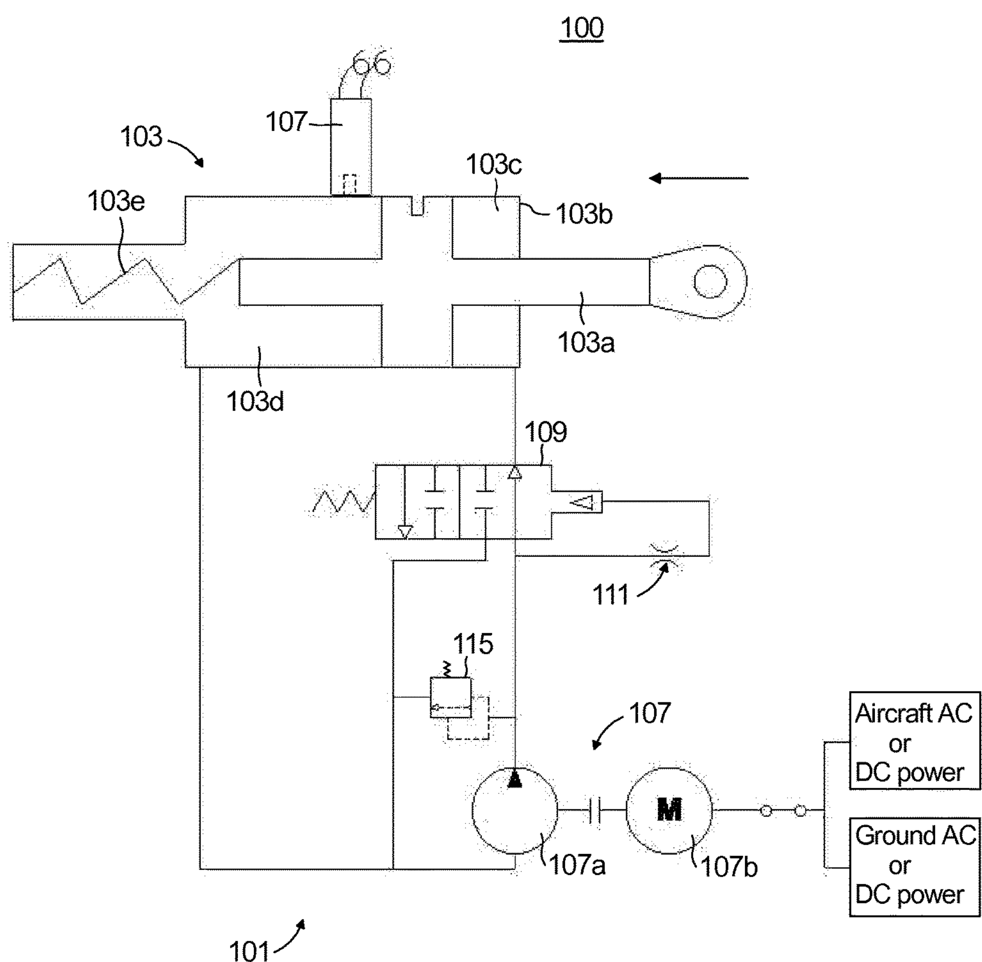
FIG. 1B is a schematic view of the system of FIG. 1A, showing the actuator retracting and the control valve in a pump position.
Figure 1C:
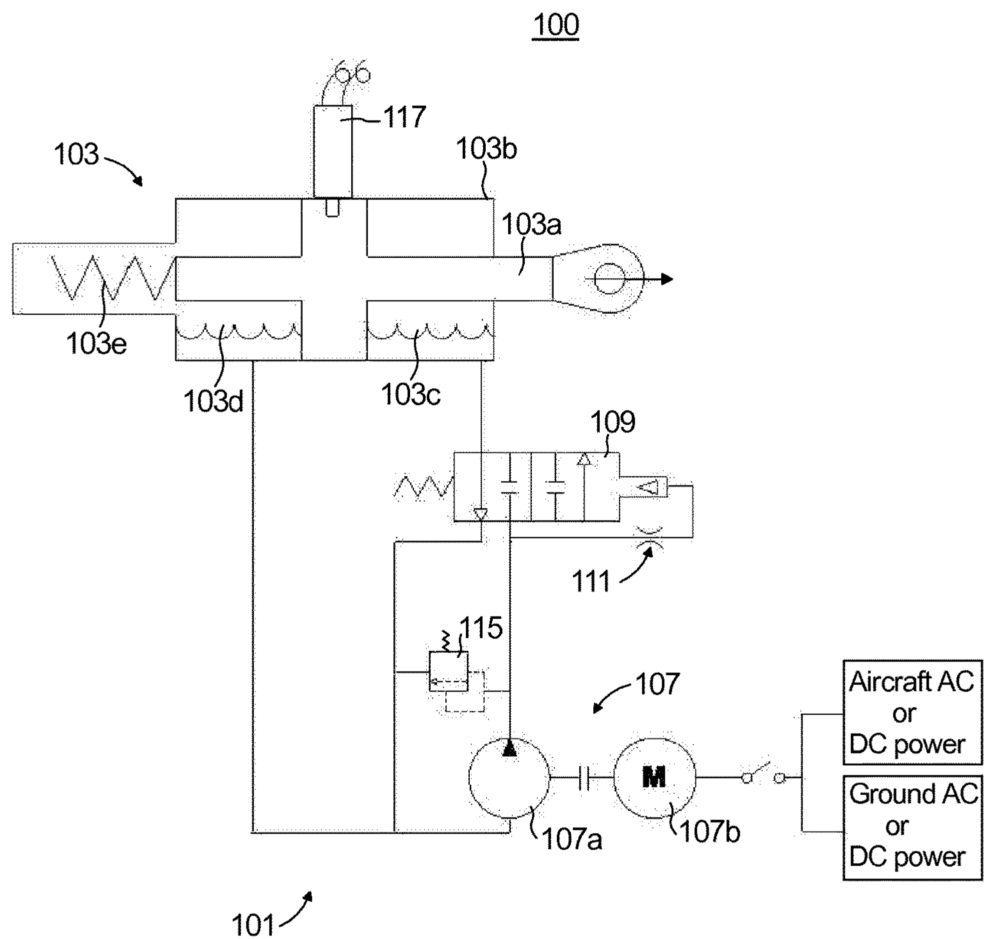
FIG. 1C is a schematic view of the system of FIG. 1A, showing the actuator in the initial retracted and locked position and the control valve in a drain position.

Referring to FIGS. 1A-1C, a ram air turbine (RAT) stowing system 100 for an aircraft includes a closed loop hydraulic circuit 101 configured to hold a quantity of a hydraulic fluid to be utilized only by the RAT stowing system 100. It is contemplated that any suitable hydraulic device other than the devices as shown and described herein can be operatively connected to the hydraulic circuit to form part of the RAT stowing system 100 as long as such devices are not associated with an aircraft hydraulic system of the aircraft.

A RAT actuator 103 is disposed in fluid communication with the closed loop hydraulic circuit 101. The RAT actuator 103 includes a piston 103*a* movable relative to a housing 103*b*. The piston 103*a* and the housing 103*b* can define a stow reservoir portion 103*c* and a deploy reservoir portion

103*d* fluidly isolated from each other (e.g., via one or more suitable seals to seal deploy reservoir portion 103*d* from stow reservoir portion 103*c*).

A pump system 107 is connected to the hydraulic circuit 101 to selectively pump the hydraulic fluid to the stow reservoir portion 103*c* of the RAT actuator 103 to move the RAT actuator 103 from a deployed position to a stowed position. The pump system 107 can include a pump 107*a*, a motor 107*b*, and/or any other suitable device. The motor 107*b* can be operatively connected to an electrical source. For example, as shown in FIGS. 1A-1C, the electrical source can be an aircraft battery and/or ground power. It is also contemplated that a separate dedicated RAT battery or any other suitable electrical source can be utilized. The pump 107*a* can be configured and/or powered to stow the RAT at any suitable angular rate under one or more conditions.

A control valve 109 is connected to the hydraulic circuit 101 between the RAT actuator 103 and the pump 107*a* to selectively allow the hydraulic fluid to be drained from the stow reservoir portion 103*c* of the RAT actuator 103 in a drain state (e.g., as shown in FIG. 1A). The control valve 109 is also configured to allow the hydraulic fluid to be pumped into the stow reservoir portion 103*c* of the RAT actuator in a pump state (e.g., as shown in FIG. 1B).

The control valve 109 can include a pressure actuated valve (e.g., a shuttle valve) such that the control valve 109 is biased to the drain state and a predetermined pressure from the pump system 107 causes the control valve 109 to change from the drain state (FIGS. 1A and 1C) to the pump state (FIG. 1B). A rate control orifice 111 can be disposed between the control valve 109 and the pump system 107 for controlling a rate of pressure build up and/or relief on the control valve 109 to control the rate of state change. For the protection of ground personnel and/or optimization of power needed to stow the RAT, the rate of state change can be slow.

Figure 2A:
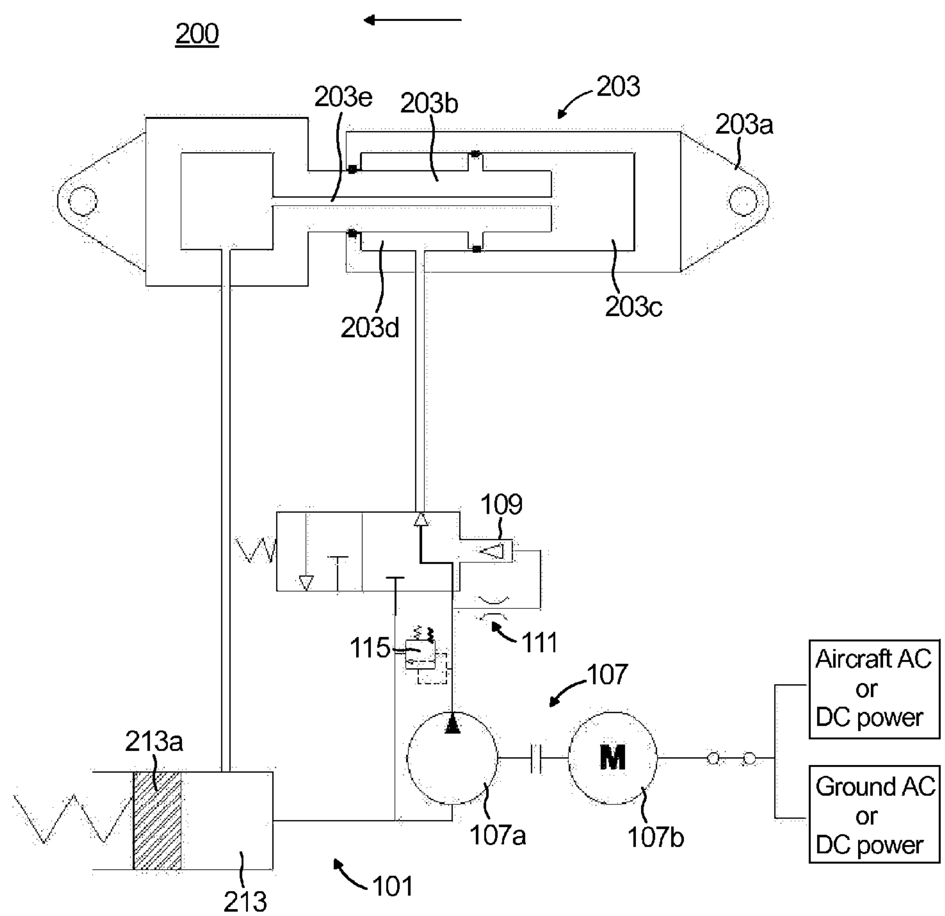
FIG. 2A is a schematic view of another embodiment of a system in accordance with this disclosure, showing the actuator moving toward the retracted position and the control valve in a pump position.
Figure 2B:
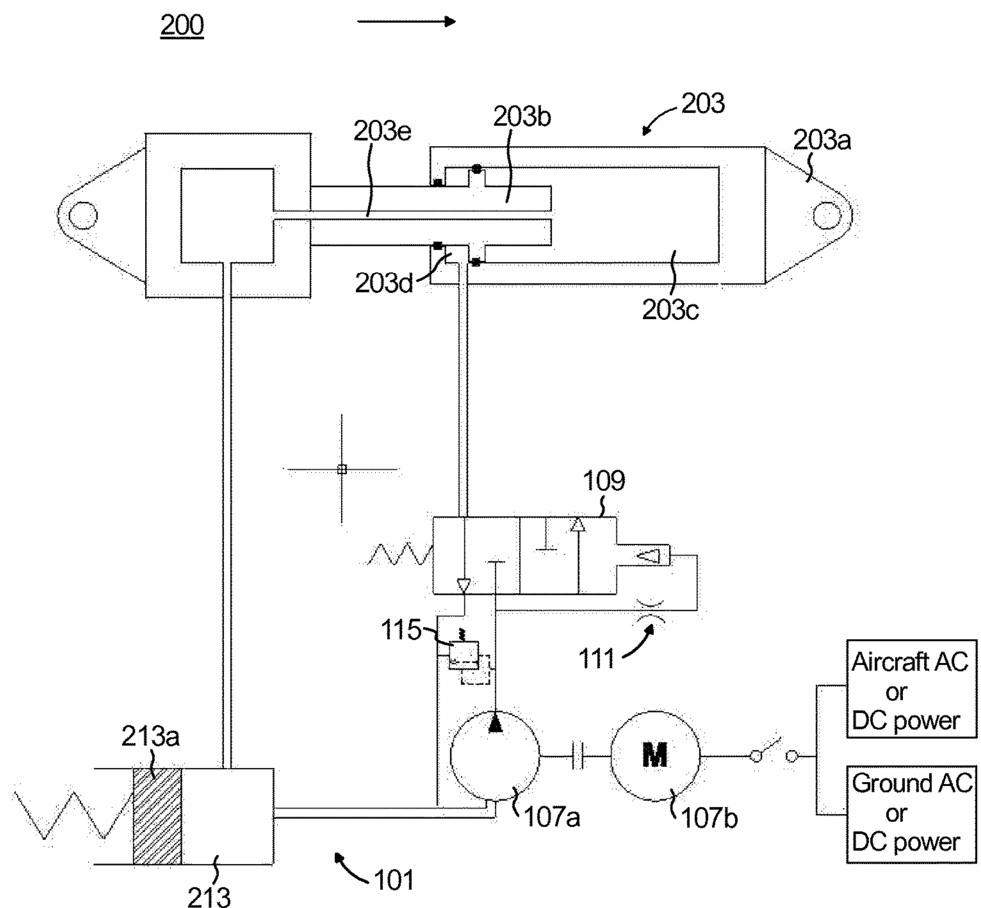
FIG. 2B is a schematic view of the system of FIG. 2A, showing the actuator moving toward the deployed position and the control valve in a drain position.

As would be appreciated by those skilled in the art, the hydraulic fluid can be drained from the stow reservoir portion 103*c* of the RAT actuator 103 through the closed loop hydraulic circuit 101 to a deploy reservoir portion 103*c* of the RAT actuator. However, referring to the embodiment as shown in FIGS. 2A and 2B, a RAT stowing system 200 can include a closed loop hydraulic circuit 101 that has an accumulator 213 disposed therein for accumulating a predetermined quantity of the hydraulic fluid when the valve 109 is in the drain state (e.g., from the stow reservoir portion 203*d*.

Referring to FIGS. 1A-2B, the closed loop hydraulic circuit 101 can include a pressure relief valve 115 for preventing over pressurization by the pump system 107. As shown, in the even an over-pressurization occurs, the pressure relief valve 115 will open and recirculate fluid flow back to the pump 107*a*.

Referring to FIGS. 1A-1C, the RAT actuator 103 can be operatively associated with a suitable locking mechanism 117 (e.g. a solenoid actuated lock) to lock the RAT actuator 103 in the stowed position (e.g., as shown in FIG. 1C) such that the pump system 107 can turn off after locking the RAT actuator 103 in the stowed position so as to relieve hydraulic pressure from the RAT actuator 103. This allows the RAT actuator 103 to be freely redeployed to the deployed position since there will be no resisting hydraulic pressure.

As shown, the RAT actuator 103 can be biased to move to the deployed position when the locking mechanism 117 is released. In certain embodiments, the RAT actuator 103 can be biased with a spring 103*e* as shown in FIG. 1A-1C. However, referring to FIGS. 2A and 2B, it is contemplated that an accumulator 213 can be in fluid communication with a RAT actuator 203. For example, the accumulator 213 can include a spring loaded piston 213*a* or other suitable pump mechanism to push fluid into the deploy reservoir portion 203*c* (e.g., through a center vent 203*e* of housing 203*b*) to maintain a hydraulic bias for the piston 203*a* to move toward the deployed position relative to the housing 203*b* when unlocked.

As shown, piston 203*a* is moveable, housing 203*b* is stationary, and deploy reservoir cavity 203*c* is fluidly isolated from stow reservoir portion 203*d* (e.g., via one or more suitable seals separating the piston 203*a* and the housing 203*b*). When the piston 203*a* is unlocked and the valve 109 is in the drain position (e.g., as shown in FIG. 2B), the piston 203*a* is pushed to the deployed position because fluid pressurized by accumulator 213 enters through center vent 203*e* and pressurizes deploy reservoir portion 203*c* against housing 203*b*.

A method includes stowing a ram air turbine (RAT) using a RAT stowing system 100, 200 as described above. By utilizing a system 100, 200 as disclosed hereinabove, the system can cost substantially less to produce and maintain since the system is independent of an aircraft hydraulic system. Also, a leaking control valve will not cause the actuator 103 to lock in the stowed position because the pump 107*a* can be turned off independent of other aircraft hydraulic systems.

Additionally, there is no draw down of aircraft hydraulic pressure when actuator extends, no aircraft level contamination requirements are imposed on the actuator 103, no screens or filters are required internally within the actuator 103 allowing for a weight and cost savings, aircraft hydraulic plumbing to the actuator 103 is eliminated which results in system weight and cost savings, a possible leak path for the aircraft hydraulic system is eliminated, and the pressure rating of the hydraulic supply to stow the RAT is dramatically reduced such that aircraft engines do not need to run to stow the RAT and no ground cart power is needed to stow RAT. The power needed for the motor and pump is very small because the stowing rate can be very low. Moreover, actuator components containing hydraulic fluid are no longer need to be sized for proof, burst, and impulse pressure requirements because they no longer integrated with other critical aircraft systems which reduces weight of the components because the components can be smaller and less robust.

Further advantages include elimination of the need for the pressure sensor in the actuator 103 to detect the presence of a high pressure in the actuator 103. There is a cockpit annunciator to alert the pilot that the RAT will not deploy due to high pressure. Elimination of this system equates to a cost reduction savings. Also, a suitable lubricating oil can be used to reduce actuator 103 internal friction since fluid is not shared with the aircraft hydraulic system, thus prolonging the life of actuator seals and enhancing corrosion resistance.

The methods and systems of the present disclosure, as described above and shown in the drawings, provide for a RAT stowing system with superior properties including lighter weight and independence from other critical aircraft systems. While the apparatus and methods of the subject disclosure have been shown and described with reference to embodiments. those skilled in the art will readily appreciate that changes and/or modifications may be made thereto without departing from the spirit and scope of the subject disclosure.

What is claimed is:

1. A ram air turbine (RAT) stowing system, comprising:

a closed loop hydraulic circuit configured to hold a quantity of a hydraulic fluid to be utilized only by the RAT stowing system;

a RAT actuator disposed in fluid communication with the closed loop hydraulic circuit;

a pump system connected to the hydraulic circuit to selectively pump the hydraulic fluid to a stow reservoir portion of the RAT actuator to move the RAT actuator from a deployed position to a stowed position; and a control valve connected to the hydraulic circuit between the RAT actuator and the pump to selectively allow the hydraulic fluid to be drained from the stow reservoir portion of the RAT actuator in a drain state and to allow the hydraulic fluid to be pumped into the stow reservoir portion of the RAT actuator in a pump state, wherein the pump system includes a pump and a motor, wherein the motor is operatively connected to an electrical source, wherein the electrical source is ground power.

2. The system of claim 1, wherein the hydraulic fluid is drained from the stow reservoir portion of the RAT actuator through the closed loop hydraulic circuit to a deploy reservoir portion of the RAT actuator.

3. The system of claim 1, the closed loop hydraulic circuit includes an accumulator disposed therein for accumulating a predetermined quantity of the hydraulic fluid when the valve is in the drain state.

4. The system of claim 1, wherein the closed loop hydraulic circuit includes a pressure relief valve for preventing over pressurization by the pump system.

5. The system of claim 1, wherein the control valve includes a pressure actuated valve, wherein the control valve is biased to the drain state, such that a predetermined pressure from the pump system causes the control valve to change from the drain state to the pump state.

6. The system of claim 5, wherein a rate control orifice is disposed between the control valve and the pump system for controlling a rate of pressure build up and/or relief on the control valve to control the rate of state change.

7. The system of claim 1, wherein the electrical source is an aircraft battery.

8. The system of claim 1, wherein the electrical source is a RAT battery.

9. The system of claim 1, wherein the RAT actuator is operatively associated with a locking mechanism to lock the RAT in the stowed position such that the pump system can turn off after locking the RAT actuator in the stowed position so as to relieve hydraulic pressure from the RAT actuator in order to allow the RAT to be freely redeployed.

10. The system of claim 9, wherein the RAT actuator is biased to move to the deployed position when the locking mechanism is released.

11. The system of claim 10, wherein the RAT actuator is biased with a spring.

12. A method, comprising:

stowing a ram air turbine (RAT) using a RAT stowing system, the RAT stowing system including:

a closed loop hydraulic circuit configured to hold a quantity of a hydraulic fluid to be utilized only by the RAT stowing system;

a RAT actuator disposed in fluid communication with the closed loop hydraulic circuit;

a pump system connected to the hydraulic circuit to selectively pump the hydraulic fluid to a stow reservoir portion of the RAT actuator to move the RAT actuator from a deployed position to a stowed position; and a control valve connected to the hydraulic circuit between the RAT actuator and the pump to selectively allow the hydraulic fluid to be drained from the stow reservoir portion of the RAT actuator in a drain state and to allow the hydraulic fluid to be pumped into the stow reservoir portion of the RAT actuator in a pump state, wherein the pump system includes a pump and a motor, wherein the motor is operatively connected to an electrical source, wherein the electrical source is ground power.

13. A ram air turbine (RAT) stowing system, comprising:

a RAT;

a closed loop hydraulic circuit configured to hold a quantity of a hydraulic fluid to be utilized only by the RAT stowing system;

a RAT actuator disposed in fluid communication with the closed loop hydraulic circuit and connected to the RAT to actuate the RAT;

a pump system connected to the hydraulic circuit to selectively pump the hydraulic fluid to a stow reservoir portion of the RAT actuator to move the RAT actuator from a deployed position to a stowed position; and a control valve connected to the hydraulic circuit between the RAT actuator and the pump to selectively allow the hydraulic fluid to be drained from the stow reservoir portion of the RAT actuator in a drain state and to allow the hydraulic fluid to be pumped into the stow reservoir portion of the RAT actuator in a pump state, wherein the pump system includes a pump and a motor, wherein the motor is operatively connected to an electrical source, wherein the electrical source is around power.

* * * * *